Jan. 8, 1935.  H. S. ARNOLD  1,986,874
ELECTRICAL DISTRIBUTION
Filed Aug. 6, 1931  4 Sheets-Sheet 1
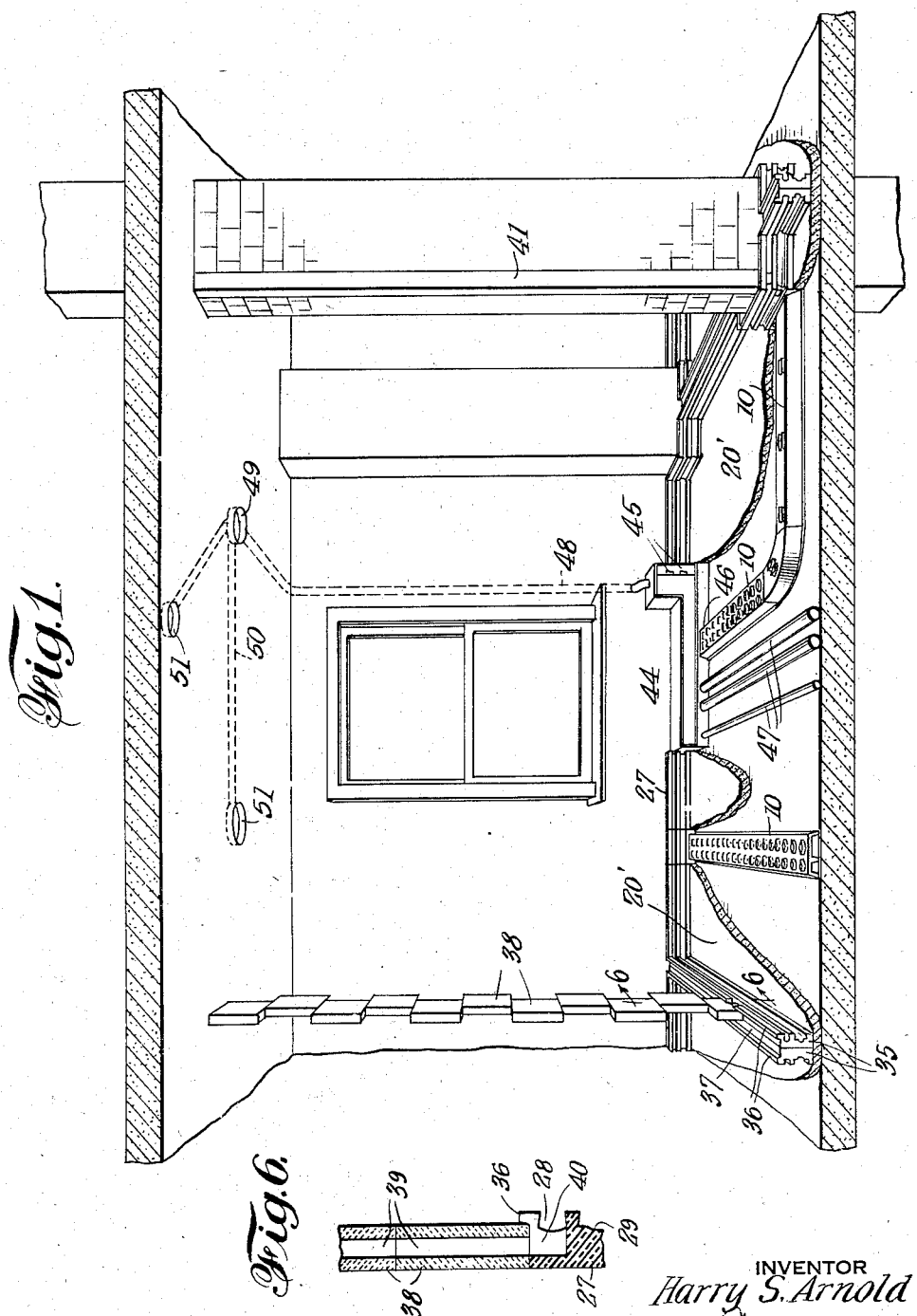
INVENTOR
*Harry S. Arnold*
BY
ATTORNEY

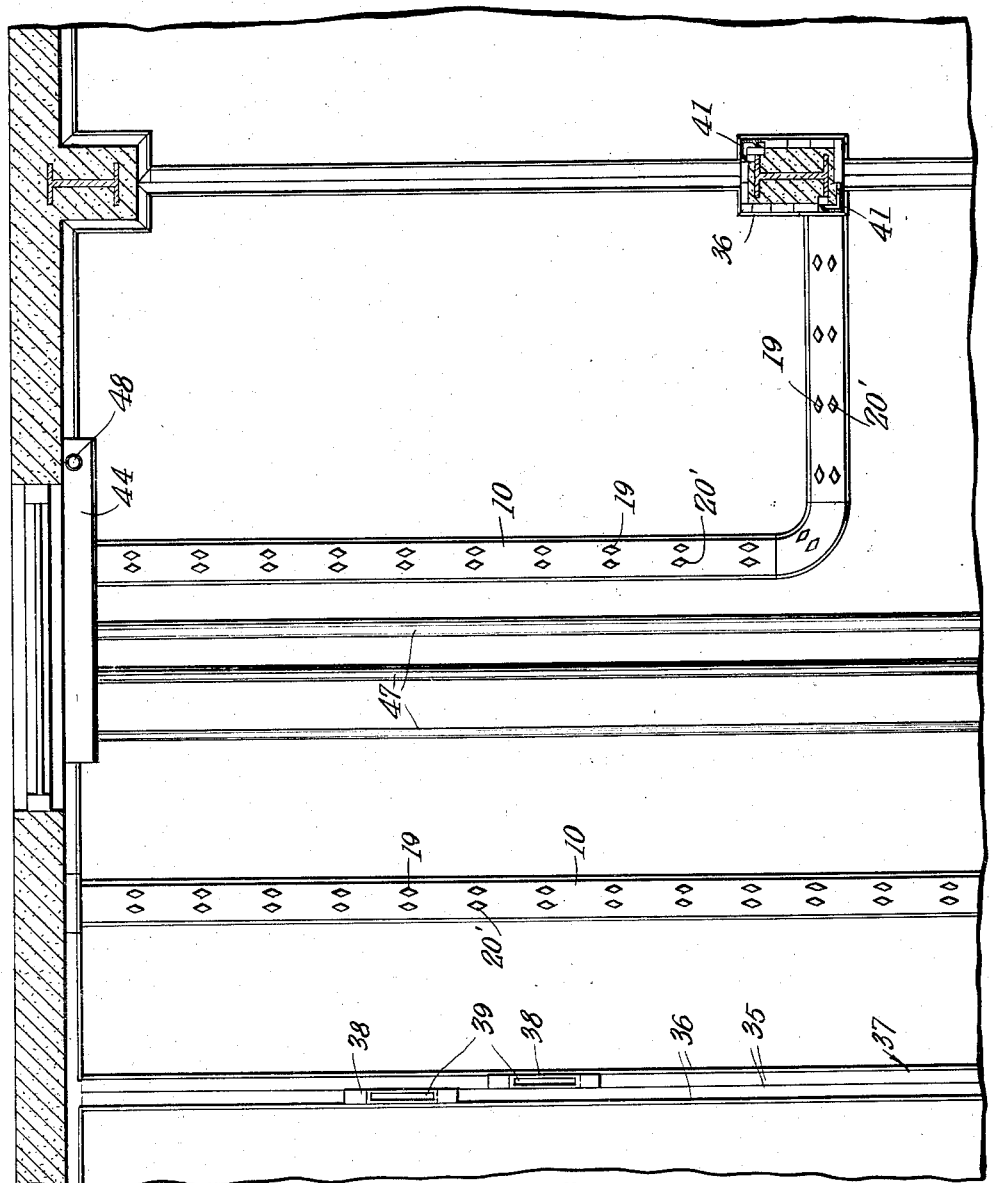

Jan. 8, 1935. H. S. ARNOLD 1,986,874
ELECTRICAL DISTRIBUTION
Filed Aug. 6, 1931 4 Sheets-Sheet 3
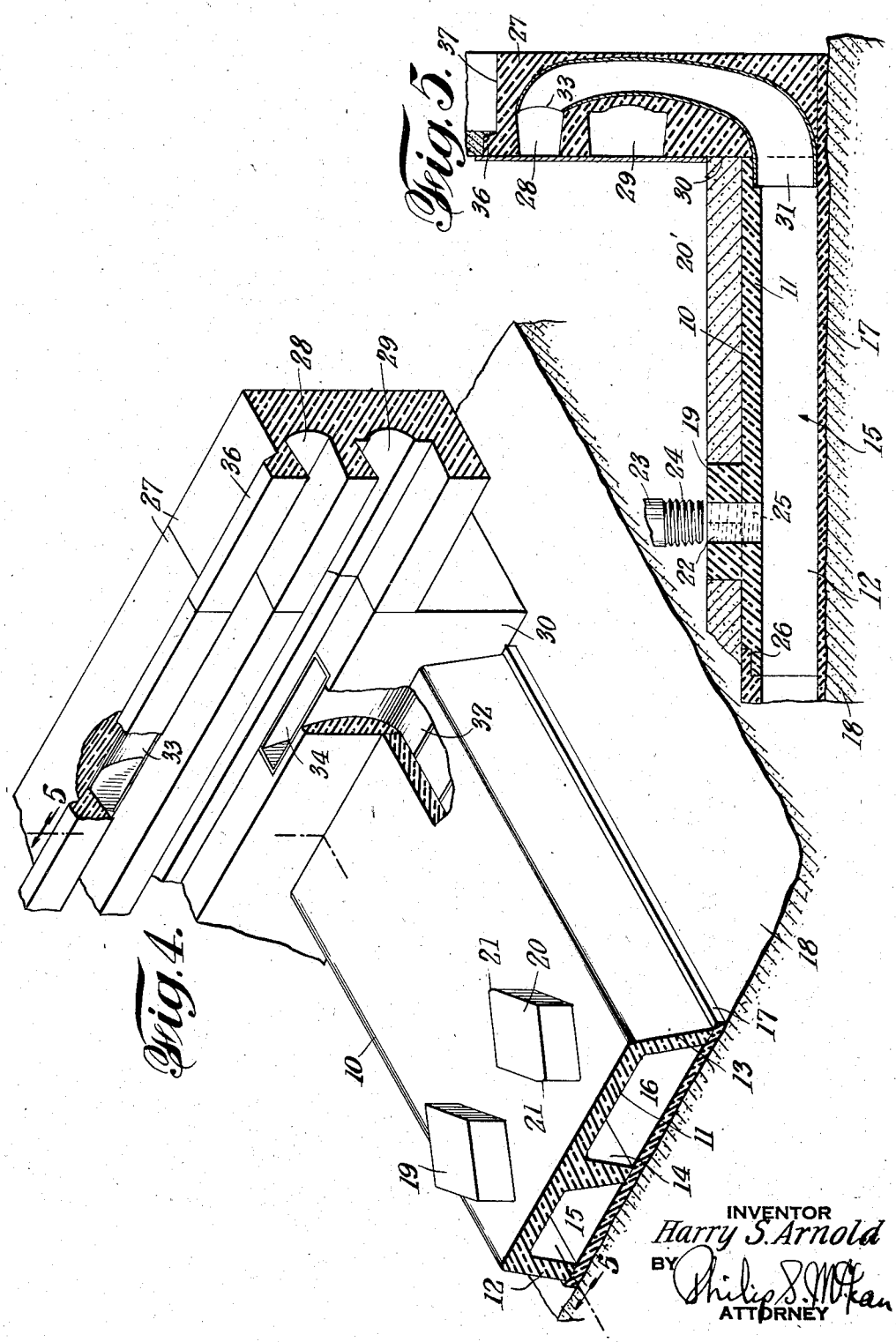
INVENTOR
Harry S. Arnold
BY
ATTORNEY Jan. 8, 1935.                H. S. ARNOLD                1,986,874
                         ELECTRICAL DISTRIBUTION
                       Filed Aug. 6, 1931    4 Sheets-Sheet 4
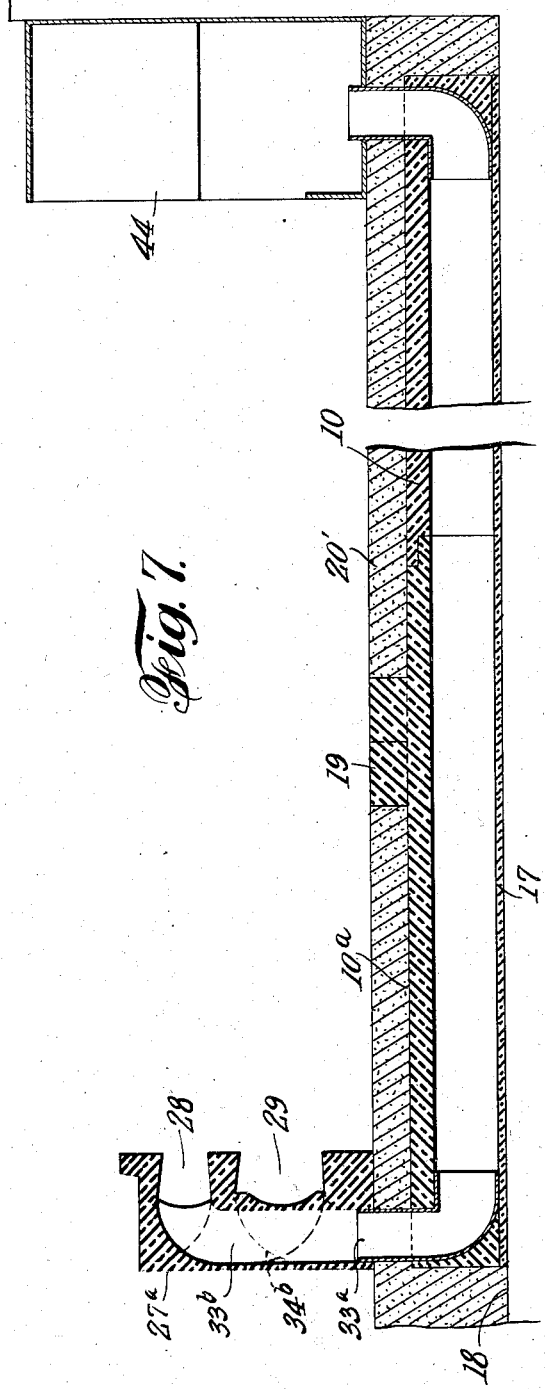
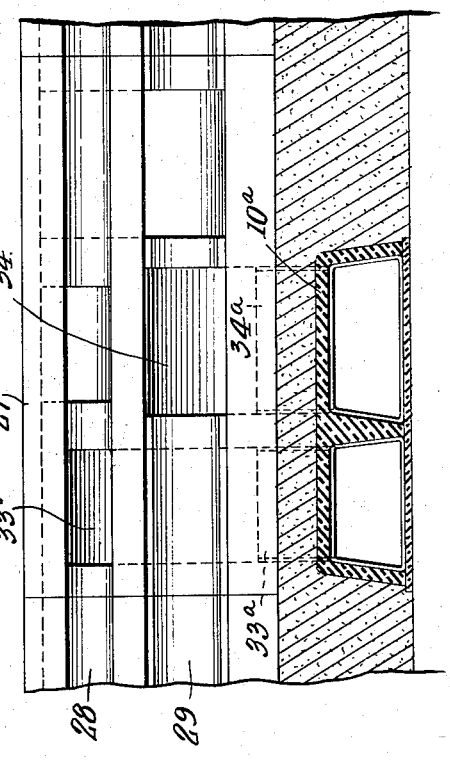
INVENTOR
*Harry S. Arnold*
BY
ATTORNEY Patented Jan. 8, 1935

1,986,874

UNITED STATES PATENT OFFICE 1,986,874

ELECTRICAL DISTRIBUTION

Harry S. Arnold, Brooklyn, N. Y.

Application August 6, 1931, Serial No. 555,508

10 Claims. (Cl. 247—3)

This invention relates broadly to the distribution of electrical wiring.

The objects of the invention are to provide a practical and relatively inexpensive system by which wiring for lighting and power, signalling, telephone or other purposes may be readily distributed and brought out where required for use at various positions relative to the floors, walls, ceiling and column structures of a building, fully "flexible" in the sense of meeting changes in wiring required by different tenants, etc. and particularly to provide a system of raceways which may be installed at the time of constructing a building at but slight additional cost and which, without marring, weakening or otherwise objectionably affecting the structure and, without the usual embedded outlet boxes and the like, will enable floor connections to be quickly made, practically at any required points and without breaking away the flooring or disturbing other parts.

The novel features of construction, combinations and relations of parts by which the foregoing and other desirable objects are attained are disclosed in the following specification, considered in combination with the accompanying drawings forming part thereof.

The drawings illustrate certain practical embodiments of the invention but as the invention is of broad scope, it should be understood that the structure may be modified and changed as regards the present disclosure without departure from the true spirit of the invention.

Fig. 1 is a perspective and broken sectional view illustrating an installation of the system in a typical building structure;

Fig. 2 is a horizontal sectional and partial plan view of such system;

Fig. 3 is an enlarged broken sectional detail of one of the corner conduits provided in a column structure;

Fig. 4 is a broken sectional perspective view illustrating the junction of one of the floor raceways with the base block raceways;

Fig. 5 is a broken vertical sectional view as on substantially the plane of line 5—5 of Fig. 4;

Fig. 6 is a broken sectional detail illustrating the junction of a partition raceway with one of the base raceways;

Fig. 7 is a sectional detail illustrating another form of connection between the floor and base raceways and junction box;

Fig. 8 is a front view of the latter construction.

In Figs. 1 and 2 a typical office building unit is illustrated, with a distribution system enabling the use of electrical fixtures or attachments practically at any desired points in the room.

One of the most important features of this system is the so-called floor raceway. This raceway as shown more particularly in Figs. 4 and 5, consists of a shallow inverted trough 10 having a substantially flat top 11 and outwardly and downwardly flaring sides 12, 13 forming a flat arch supported by a partition 14 which may be positioned either centrally or to one side of the center, as shown, to provide a so-called high tension conduit way 15 and a somewhat larger so-called low tension way 16. This raceway may be mounted in its inverted relation on a pad 17 provided for the purpose on the floor slab 18.

In order that service connections may be made with the raceway where required, there are provided on the raceway upstanding lugs or bosses 19, 20 directly over the channels 15, 16 and rising to the height of the floor level 20', Fig. 5, which bosses form in effect part of the floor surface and show definitely where the raceway channels may be entered. These bosses may by way of example be located on two foot centers or even closer since they are integral portions of the raceway and can be inexpensively produced in the molding or manufacture of the raceway.

A practical and desirable method is to mold or cast the raceway of plastic cementitious material, which on setting becomes hard, tough, waterproof, fireproof and which can be worked with cutting, drilling and screw threading tools and will hold nails, screws or other fastenings. A magnesite composition has been found suited to this purpose, the same being readily molded in the shapes required and having the desired strength, wearing qualities and workability. This material also may be colored if desired to give the lugs 19, 20 which appear as part of the floor surface, ornamental or individualistic character. One set of lugs may be colored differently from the other to distinguish the high tension from the low tension channel or other means of identifying the same may be employed, as by making the two lugs of entirely different or slightly different shape. In the illustration, the lugs are shown as of generally square or diamond shape, arranged diagonally, with the corners pointing in the direction of the length of the conduit and with the corners of the low tension markers or "spots" 20 somewhat rounded as at 21 in Fig. 4 to distinguish this conduit from the other. One or both sets of markers might be of circular or elliptical outline, triangular or other more or less fanciful shape, depending on the degree of prominence desired or use of the spots as ornamental characters in the floor. The distinguishing of one set from the other also might be in the matter of size or differences in spacing and the spots may be placed directly alongside each other in pairs, be alternated, or otherwise arranged, this also being governed to some extent according to the use of the same for ornamental purposes. The diamond shape gives a simple ornamental effect which is quite desirable, indicates the direction of the raceway passages and by such indication also shows the direction of the nearest branch or feed connections.

The actual entrance to the raceway is effected in the present disclosure by simply drilling a hole 22 down through the selected marker into the channel beneath such marker. This may be accomplished by a wood or metal boring tool, in the magnesite form of raceway above featured. The bore thus provided being the thickness of the top of the raceway plus the height of the spotting lug is sufficiently long to provide a firm bearing and support for a length of conduit or outlet pipe inserted therein, particularly when the same is screw threaded into such bore. A portion of such a pipe is shown at 23 in Fig. 5 having a screw threaded end 24 which can be turned to cut the companion screw seat 25 directly in the walls of such bore. If desired, this screw seat may be formed by an ordinary screw tap but the pipe thread is usually sufficient for the purpose, the hole being drilled slightly smaller than the pipe thread, as indicated to enable the pipe to cut a proper thread for itself in the bore.

The raceway may be made in straight, curved, elbow or other sections, in various length and all combined in various ways, to meet the layout requirements of different buildings. The lengths of raceway may be suitably joined as by interfitting or overlapping joints such as indicated at 26 in Fig. 5.

At the ends or intermediate points, the raceways may connect with horizontally or vertically extending ways, thus as shown more particularly in Figs. 4, 5, 7 and 8, the floor raceways may connect at the ends with the baseboard raceways shown as composed of base blocks 27 having open front high tension and low tension channels 28, 29 in the face of the same.

In the construction shown in Figs. 4 and 5 connection of the floor channels with the baseboard channels is effected by abutting the end of the floor raceways with a dependent portion 30 of one of the base blocks with the channels 15, 16 thereof engaged over the throats 31, 32 projecting from the face of such extension and extending upwardly through the block into communication respectively with the high and low tension channels of the block at 33, 34. These pass up through the special connection blocks and may be provided by metallic tubing members molded in the block at the time of manufacture, curved as indicated to present a smooth easy passage for the fishing of the wires and arranged as indicated in Fig. 5 with the insert going to the upper raceway extending up through the back of the block in rear of the lower raceway, and with the two inserts offset in the length of the block so as not to interfere one with the other. As an alternative, if desired, the passes 33, 34 may be formed entirely of the material of the block, including sufficient of a boss or projection at the bottom for the end of the floor race to be interlocked with.

In the form illustrated in Figs. 7 and 8, the connecting base blocks 27a are the same height as the adjoining base blocks and like the adjoining blocks, rest directly on the floor surface and special end blocks 10a are provided at the ends of the floor raceways having upwardly extending ways 33a, 34a formed by inserts or otherwise, as above described and projecting above the floor level up into the companion throat portions 33b, 34b opening down through the bottom of the base block. This construction has the advantage over the first described that the base blocks can all be put in after the floor has been laid, instead of requiring as in Figs. 4 and 5 that the connection base blocks be placed before the floor is completed or openings be left to set such blocks down in the floor.

The base blocks carrying the channels for the high and low tension wiring are indicated as extending continuously about the walls of the room, including partitions, columns, etc. At the partitions the base blocks may be placed back to back as at 35, Fig. 1, the top flanges 36 of such blocks then providing a channel 37 for the hollow tile or other partition forming elements. Raceways are provided in the partitions in the present disclosure by the special partition blocks or tiles 38, Figs. 1 and 2 having vertical passages 39 up through the same which as indicated, may be formed nearest one end of the block so that by alternate arrangement of superposed blocks, they may be keyed in the wall with passageway extending vertically in a straight line. The blocks may be of half the thickness of the partition, as indicated in Fig. 2 so that separate raceways may be provided in adjoining rooms and even with such blocks placed in alignment back to back.

At the lower ends the partition raceways 39 may be connected with the baseboard raceways by simply drilling down through the base blocks or notching out sections of the block as indicated at 40, 40 in Fig. 6 to communicate with either or both the channels 28, 29.

Vertical raceways on the columns are provided in the illustration by the special angular corner tiles shown at 41, Figs. 1, 2 and 3, placed on diagonally opposite corners of the finished column, resting at the bottom behind the flanges 36 of the base blocks and communicating with the wiring channels 28, 29 therein as by the cutouts 42, 43 indicated down through the tops of the blocks.

Beneath the windows, junction boxes such as indicated at 44 may be provided the same being shown as communicating at opposite ends with the channels in the base blocks at 45 and at the front with one of the floor raceways at 46 and a number of pipe conduits 47. Also in Fig. 1 a pipe conduit 48 is indicated extending from the top of the box up through the wall and over into the ceiling structure to a ceiling outlet 49 from which branches 50 extend to other portions of the ceiling to additional ceiling outlets 51.

By the construction and combination disclosed, service connections for lighting or power purposes, telephones, signals, call systems or the like may be made at any time practically anywhere about the room, including the floor, side walls, partitions, columns, and ceiling and at but very slight expense. The initial installation is relatively inexpensive, particularly as regards the floor raceways, which possibly are the most important of the system. The location and extent of such raceways is known from the indicators or markers in the floor, which form parts of both the floor and the raceways and serve when entered to provide seats and reinforcement for the service pipes, conduits or fittings engaged therewith. These raceways, with their double channels provide in the one structure, conduits for both the high tension and low tension circuits, eliminating the need for the separate conduit systems heretofore found necessary and, because of their flat arch construction, reinforced by the intermediate dividing partition, they do not take up too much room in the cinder fill of the floor and are fully capable of carrying the floor loads. More or less than two ducts may be formed in each raceway and the raceway blocks may be constructed of other than the materials above described, for example they may be rolled of sheet metal, with the floor level spotting members struck up as hollow imperforate bosses. As illustrated in Fig. 7 the junction boxes 44 do not extend below the floor level and may in fact, like the base blocks 27a be set upon the floor finish and the raceways be entered through the bottom of the same. Many other changes and modifications may be made all within the broad scope of the patent claims. The system as designed concentrates all of the electric wiring for each individual tenant in one bay and thereby maintains privacy for tenants' spaces because of such fact that wires entering each bay do not have to pass through other bays.

The invention being of broad scope, it should be understood that the terms employed herein have been used in a descriptive, rather than in a limiting sense except for such possible limitations as may be imposed by the state of the prior art.

What is claimed is:

1. A floor raceway comprising a unitary molded body of cementitious material having a multiplicity of wire receiving channels in the underside of the same and solid bosses on the top of the body over the channels therein.

2. A floor raceway comprising a unitary molded body of cementitious material having a multiplicity of wire receiving channels in the underside of the same and solid bosses on the top of the body over the channels therein and said cementitious material being of a readily cut structure adapted to be bored down through said bosses and to take the screw threads for sustaining a screw threaded conduit or the like.

3. An underfloor duct of readily machined cementitious material in the form of a hollow arch having integral upstanding bosses rising to a height substantially equal to the floor level line.

4. An underfloor duct of readily machined cementitious material in the form of a hollow arch having integral upstanding bosses rising to a height substantially equal to the floor level line, said bosses being imperforated and whereby the same may be drilled and tapped at the floor level for wire servicing attachments.

5. A multiple duct underfloor raceway having upstanding floor level bosses over the ducts and characteristically distinguished those over one duct from those over another duct.

6. A floor raceway, comprising unitary molded blocks of cementitious material having a multiplicity of downwardly open wire receiving channels in the underside of the same and provided by intermediate partition or partitions forming a column or columns supporting the intermediate arch portions of the blocks and upstanding bosses on the blocks over the individual wire receiving channels and characteristically distinguished those over one channel from those over another channel.

7. In combination, unitary molded multiple duct floor raceway blocks and multiple duct baseboard blocks of cementitious material, said baseboard blocks being seated at the ends of said floor raceway blocks and having conduits extending each from an individual duct therein to an individual duct in the floor raceway blocks, said blocks having interfitting portions at their adjoining ends establishing communication of said individual conduits in the wall base blocks with said individual ducts in the multiple duct raceway block.

8. A floor construction, comprising a concrete floor slab, a pad on said floor slab, a composition duct supported on said pad, said duct having a top wall and side walls with projections on said top wall, concrete flooring material on said floor slab, flush with the top of said projections, said projections being integral with said duct and of a composition capable of being drilled.

9. In combination, molded multiple duct floor raceway blocks of cementitious material, molded multiple duct baseboard blocks of cementitious materials, said two sets of blocks having interlocking members establishing communication between each duct in the floor raceway blocks and a particular duct in the baseboard blocks and molded wall blocks of cementitious material having a duct in communication only with a particular duct of the baseboard blocks.

10. In combination, wall tiles having vertical wire raceways therethrough and located nearest one end of each tile and whereby said tiles assembled in alternately reversed relation will provide a straight wire raceway up therethrough.

HARRY S. ARNOLD.